(12) United States Patent
Kim et al.

(10) Patent No.: US 9,882,938 B2
(45) Date of Patent: Jan. 30, 2018

(54) COMPOSITE ARS SERVICE PROVIDING METHOD AND APPARATUS

(71) Applicant: Samsung Electronics Co., Ltd., Gyeonggi-do (KR)

(72) Inventors: Dohyung Kim, Gyeonggi-do (KR); Young-Ky Kim, Seoul (KR); Jae-Duck Lee, Seoul (KR); Ki-Ho Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/601,923

(22) Filed: Jan. 21, 2015

(65) Prior Publication Data
US 2015/0208447 A1 Jul. 23, 2015

(30) Foreign Application Priority Data
Jan. 21, 2014 (KR) .................. 10-2014-0007291

(51) Int. Cl.
*H04L 29/06* (2006.01)
*H04W 76/02* (2009.01)

(52) U.S. Cl.
CPC ....... *H04L 65/1016* (2013.01); *H04W 76/022* (2013.01)

(58) Field of Classification Search
CPC .................. H04W 76/02; H04L 65/1016
(Continued)

(56) References Cited

U.S. PATENT DOCUMENTS

| 8,977,242 B1* | 3/2015 | Brown | H04W 4/16 455/412.1 |
| 2004/0120479 A1* | 6/2004 | Creamer | H04M 3/493 379/88.22 |

(Continued)

FOREIGN PATENT DOCUMENTS

| KR | 1020120018877 | 3/2012 |
| KR | 1020120063825 | 6/2012 |

OTHER PUBLICATIONS

3rd Generation Partnership Project; Technical Specification Group Services and System Aspects; IP Multimedia Subsystem (IMS); Stage 2 (Release 10), 3GPP TS 23.228 V10.7.0, Dec. 2011, 272 pages.

(Continued)

*Primary Examiner* — Michael Mapa
(74) *Attorney, Agent, or Firm* — The Farrell Law Firm, P.C.

(57) ABSTRACT

Methods and apparatuses are provided for operating a server apparatus for providing a composite Automatic Response System (ARS) service through a mobile communication network. An ARS scenario and composite ARS related information are received from a first terminal. The composite ARS related information includes video ARS related information and voice ARS related information based on the ARS scenario. The ARS scenario and the composite ARS related information are stored. A call establishment request message directed to the first terminal, is received from the second terminal. The composite ARS related information is provided to the second terminal in response to the received call establishment request message. A call is established between the first terminal and the second terminal in response to an input for a call connection request, directed (Continued)

to the first terminal, received while the composite ARS related information is provided to the second terminal.

20 Claims, 8 Drawing Sheets

(58) Field of Classification Search
USPC .............. 455/414.1, 445, 450; 370/352–354
See application file for complete search history.

(56) References Cited

U.S. PATENT DOCUMENTS

| | | | |
|---|---|---|---|
| 2007/0036294 A1* | 2/2007 | Chaudhuri | H04M 3/42153 379/88.16 |
| 2008/0028318 A1* | 1/2008 | Shikuma | G11B 27/034 715/744 |
| 2009/0147778 A1* | 6/2009 | Wanless | G06Q 30/02 370/389 |
| 2013/0022181 A1* | 1/2013 | Or-Bach | H04M 3/493 379/88.11 |
| 2013/0035054 A1 | 2/2013 | Ashton | |
| 2013/0138443 A1 | 5/2013 | Kim et al. | |
| 2013/0217368 A1* | 8/2013 | Kim | H04M 3/51 455/414.1 |
| 2015/0178765 A1* | 6/2015 | McBride | G06Q 30/0241 705/14.69 |

OTHER PUBLICATIONS

GSM Association, "RCS API Detailed Requirements", Version 2.1, Rich Communication Suite, Jul. 5, 2012, 63 pages.

* cited by examiner

COMPOSITE ARS SERVICE PROVIDING METHOD AND APPARATUS

PRIORITY

This application claims priority under 35 U.S.C. §119(a) to a Korean patent application filed in the Korean Intellectual Property Office on Jan. 21, 2014 and assigned Serial No. 10-2014-0007291, the content of which is incorporated herein by reference.

BACKGROUND OF THE INVENTION

1. Field of the Invention

The present invention relates generally to an Automatic Response System (ARS) service, and more particularly, to a method and an apparatus for providing a composite ARS through a mobile communication network.

2. Description of the Related Art

An ARS service is a system that primarily provides remote customer service or marketing through the use of a phone. An enterprise that provides the ARS service must make a direct investment for system implementation. Since most ARS services are provided as a one-to-one service, there is a need to maintain many telephone operators in order to provide a high-quality service. The direct investment and the maintaining of many telephone operators are great burdens, in particular, to small and medium-sized businesses. Additionally, with respect to a service that is received, a user may be required to undergo a series of scenarios in order to access a desired menu.

SUMMARY OF THE INVENTION

The present invention has been made to address at least the above problems and/or disadvantages and to provide at least the advantages described below. Accordingly, an aspect of the present invention provides a method and an apparatus for implementing an ARS service system that is more appropriate for small and medium-sized businesses, thereby providing an ARS service based thereon.

Another aspect of the present invention provides a method and an apparatus for allowing users to access a desired ARS service menu in an easier manner.

According to an embodiment of the present invention, a method is provided for operating a server apparatus for providing a composite ARS service through a mobile communication network. An ARS scenario and composite ARS related information are received from a first terminal. The composite ARS related information includes video ARS related information and voice ARS related information based on the ARS scenario. The ARS scenario and the composite ARS related information are stored. A call establishment request message directed to the first terminal, is received from the second terminal. The composite ARS related information is provided to the second terminal in response to the received call establishment request message. A call is established between the first terminal and the second terminal in response to an input for a call connection request, directed to the first terminal, received while the composite ARS related information is provided to the second terminal.

According to another embodiment of the present invention, a method is provided for operating a terminal apparatus for providing a composite ARS service through a mobile communication network. A call establishment request message, directed to a first terminal, is transmitted to a server apparatus of the mobile communication network. Composite ARS related information, which includes video ARS related information and voice ARS related information based on an ARS scenario that is stored in advance in the server apparatus in association with the first terminal, is received from the server apparatus. A call connection request, directed to the first terminal, is transmitted to the server apparatus to establish a call between the first terminal and the terminal apparatus while the composite ARS related information is provided at the terminal apparatus.

According to another embodiment of the present invention, a server apparatus is provided for providing a composite ARS service through a mobile communication network. The server apparatus includes a first server and a second server. The first server is configured to receive, from a first terminal, an ARS scenario and composite ARS related information, the composite ARS related information including video ARS related information and voice ARS related information based on the ARS scenario, store the ARS scenario and the composite ARS related information, provide the composite ARS related information to a second terminal in response to reception of a call establishment request message directed to the first terminal from the second terminal. The second server is configured to receive the call establishment request message from the second terminal, and establish a call between the first terminal and the second terminal in response to an input for a call connection request directed to the first terminal received while the composite ARS related information is provided to the second terminal.

According to another embodiment of the present invention, a terminal apparatus is provided for providing a composite ARS service through a mobile communication network. The terminal apparatus includes a first client and a second client. The first client is configured to transmit a call establishment request message, directed to a first terminal, to a server apparatus of the mobile communication network. The second client is configured to receive, from the server apparatus, composite ARS related information, which includes video ARS related information and voice ARS related information based on an ARS scenario that is stored in advance in the server apparatus in association with the first terminal. The first client is further configured to transmit, to the server apparatus, a call connection request, directed to the first terminal, to establish a call between the first terminal and the terminal apparatus while the composite ARS related information is provided at the terminal apparatus.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
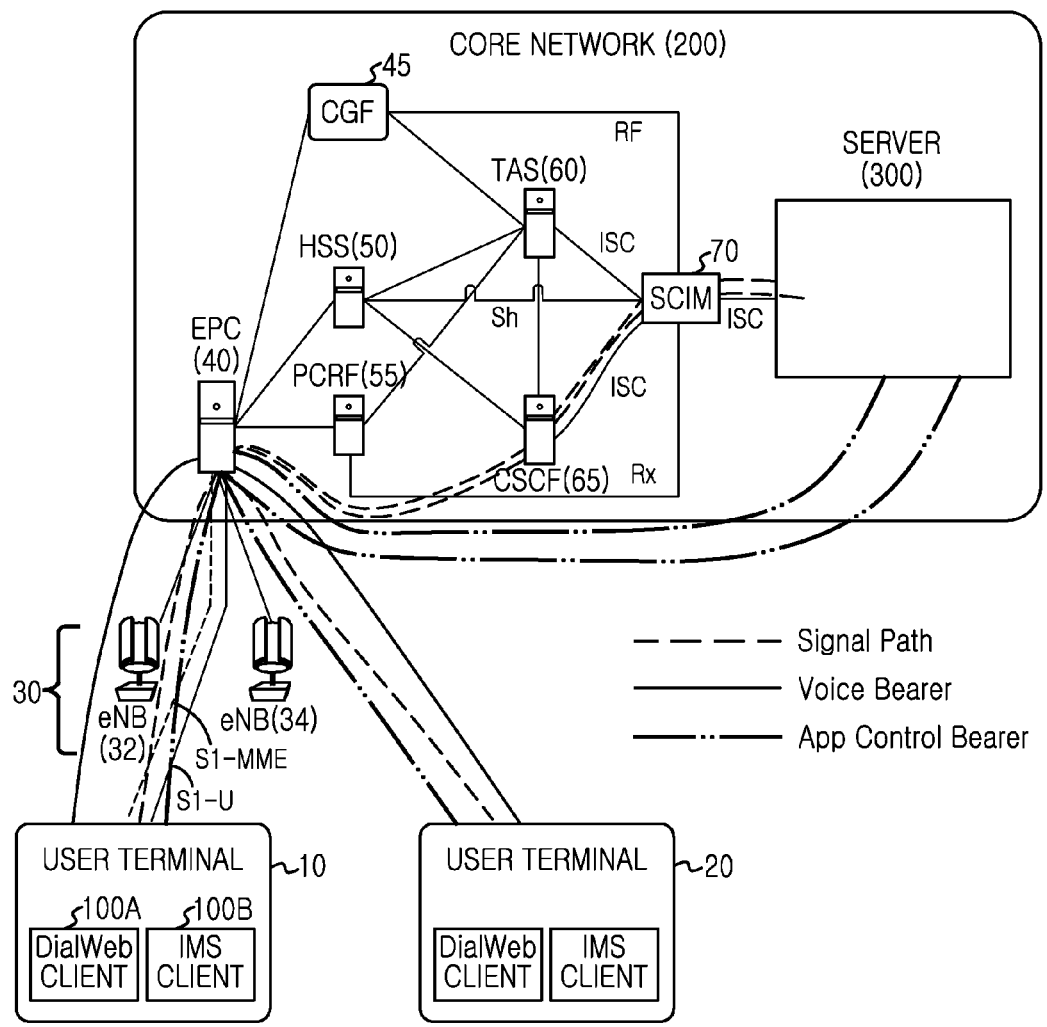
FIG. 1 is a diagram illustrating a network architecture, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention described below relate to a method in which a mobile communication vendor (e.g., a Voice over Long Term Evolution (VoLTE) Internet Protocol (IP) Multimedia Subsystem (IMS) system) can provide an ARS service to small and medium-sized enterprises or businesses, which have difficulties maintaining an expensive ARS system. The communication vendor substitutes an ARS service by using an IMS system. In addition, in an embodiment of the present invention, since it is impossible for small and medium-sized businesses to employ a large number of operators, a menu is supported through a screen together with a voice so that a user can sufficiently receive a desired service through an ARS menu scenario. As such, since the screen and the voice are simultaneously provided when a voice and video-based composite ARS service is provided, ARS service quality is improved. Thus, direct telephone connection is minimized to one or two operators in the small and medium-sized businesses.

FIG. 1 is a diagram illustrating a network architecture, according to an embodiment of the present invention.

Referring to FIG. 1, the network includes user terminals 10 and 20, an access network 30, and a core network 200.

Each of the user terminals 10 and 20 includes an IMS client 100B for a voice telephony service (e.g., VoLTE). Further, each of the user terminals 10 and 20 includes a DialWeb client 100A. For example, the user terminals 10 and 20 may be embodied as smart phones. However, the user terminals 10 and 20 may also be embodied as electronic devices such as, for example, smart pads, tablets, laptop computers, and the like, which provide not only a voice telephony service, but also a multimedia service function similar to the smart phones. In an embodiment of the present invention described herein, the user terminal is embodied as a smart phone.

The access network 30 is an LTE access network, and includes eNodeBs (eNBs) 32 and 34. The core network 200 includes an Evolved Packet Core (EPC) 40, a Home Subscriber Server (HSS) 50, a Policy and Charging Rules Function (PCRF) 55, a Call State Control Function (CSCF) 65, a Charging Gateway Function (CGF) 45, a Telephony Application Server (TAS) 60, a Service Capability Interaction Manager (SCIM) 70, and the like. In addition, the core network 200 includes a server device 300.

Figure 2:
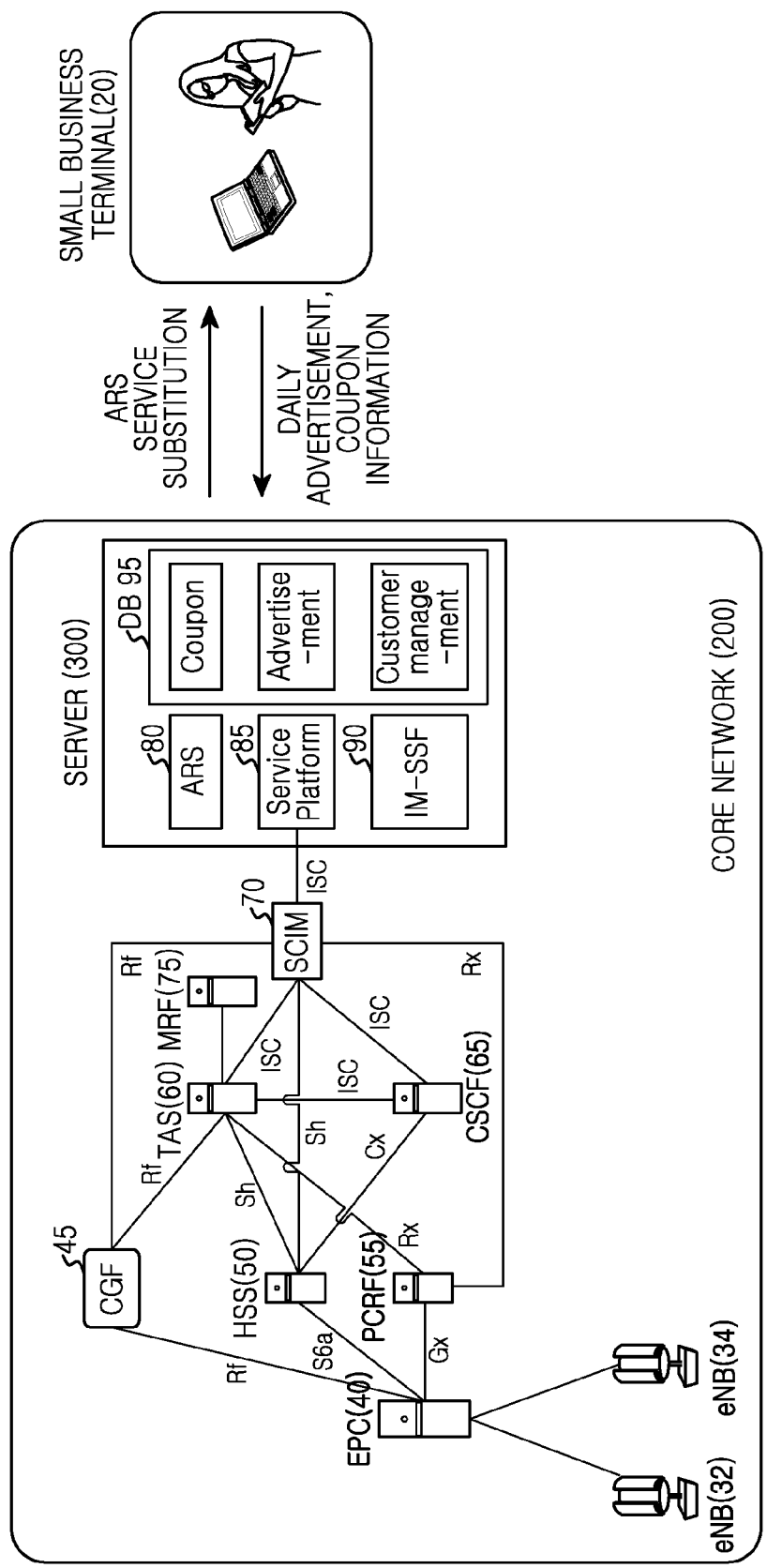
FIG. 2 is a diagram illustrating a mobile communication network that provides an ARS service, according to an embodiment of the present invention.

FIG. 2 is a diagram illustrating a mobile communication network that provides an ARS service, according to an embodiment of the present invention.

Referring to FIG. 2, a server device 300 of the core network 200 (e.g., an LTE network) includes constitutional elements such as, for example, an ARS server 80, a service platform server 85, an IP Multimedia Service Switching Function (IM-SSF) 90, and a DataBase (DB) 95. The ARS server 80 provides a voice and video-based composite ARS service. The IM-SSF 90 provides an interworking function with an Intelligent Network (IN) service of a communication vendor. The service platform server 85 controls a function for providing screen information during a telephone call, and provides a basic platform for implementing/installing various service requirements of the communication vender. The DB 95 stores a coupon, an advertisement, customer management information, and the like.

The server device 300 may also include constitutional elements such as, for example, a Rich Communication Suite (RCS) server, a Web Real-Time Communication (WebRTC) gateway, and a media server. The RCS server consists of Instant Messaging (IM) which supports chatting, a Presence Server (PS) which provides current state information of a user, a sharing server which is in charge of a sharing function for sharing a video, file, and image during a call, a location sharing server which provides a location sharing function, a Converged Address Book (CAB) which is for sharing a network-based address book and profile, and an XML Document Management System (XDMS) which is for managing user information. The media server provides a multilateral multimedia call function during a call. The WebRTC gateway provides a WebRTC-IMS signal, and a bearer conversion function required when the WebRTC server makes a call to an IMS network.

As shown in FIG. 2, the server device 300 of the core network 200, which is the communication vender, provides, in advance, a toolkit for creating a voice/video-based composite ARS scenario configuration and an advertisement message to a small business terminal 20 in order to substitute the composite ARS service for small businesses. The toolkit performs a function of generating a voice file (e.g., Media Server Markup Language (MSML), VoiceXML) and a video file (e.g., Hyper Text Markup Language (HTML), eXtensible Markup Language (XML), and Cascade Style Sheets (CSS)) so that the voice and video-based ARS service can be provided on a user terminal. In addition, the server device 300 receives and stores the voice/video-based ARS scenario configuration and advertisement message created by using the toolkit on the small business terminal. If a call to the small business terminal is received in such a state, the server device 300 provides an ARS service to a transmitting-side terminal based on the stored composite ARS scenario and advertisement message.

A method of substituting a voice/video-based composite ARS service by a communication vender, according to an embodiment of the present invention, may be performed by a structure described in detail below with respect to FIG. 3 or FIG. 4.

Figure 3:
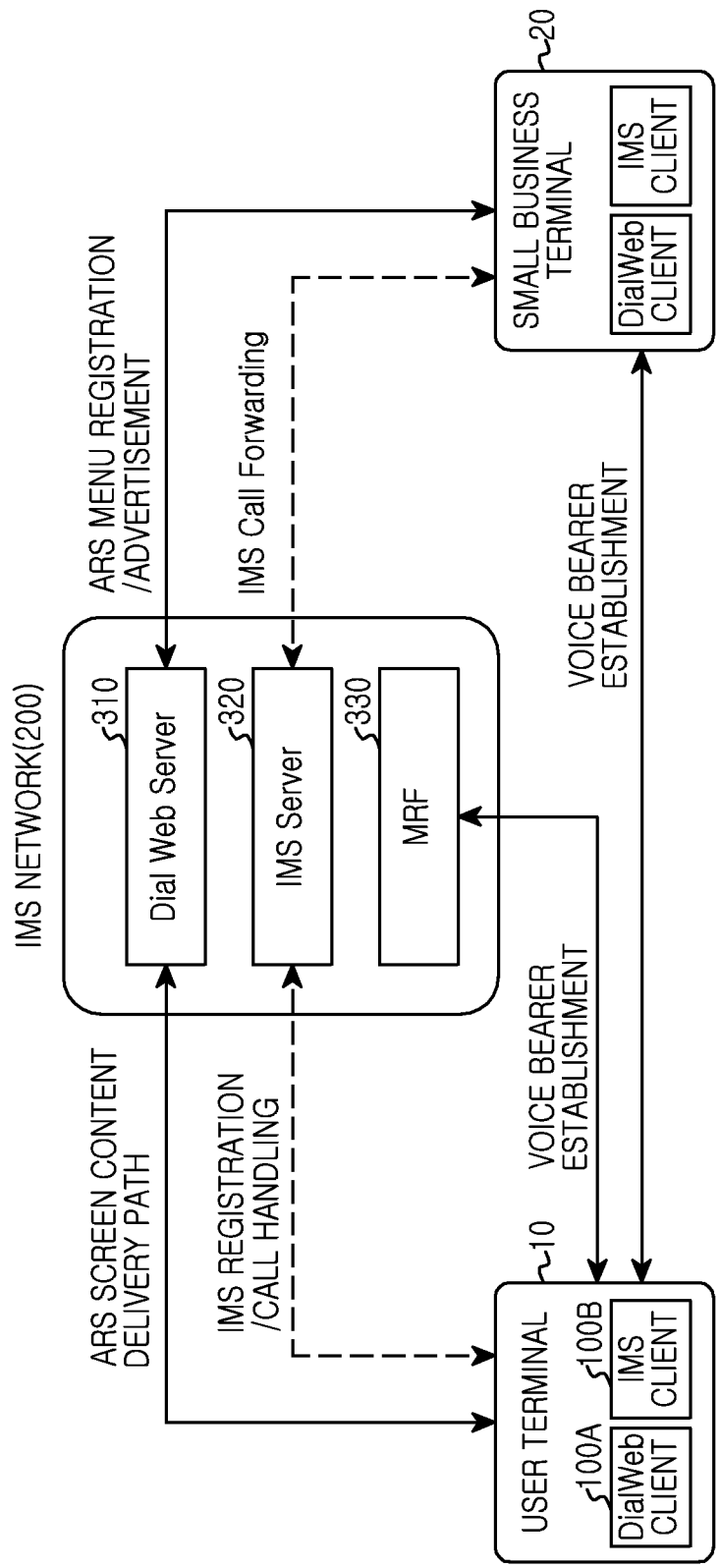
FIG. 3 is a diagram illustrating a structure of a composite ARS service providing system, according to an embodiment of the present invention.

FIG. 3 is a diagram illustrating a structure of a composite ARS service providing system, according to an embodiment of the present invention. The composite ARS service providing system includes a user terminal 10 as a transmitting-side terminal, the small business terminal 20 as a receiving-side terminal, and the IMS network or the core network 200 for providing the user terminal 10 with a composite ARS service according to a composite ARS scenario for the small business terminal 20. The IMS network 200 includes a DialWeb server 310, an IMS server 320, and a Media Resource Function (MRF) 330.

Figure 4:
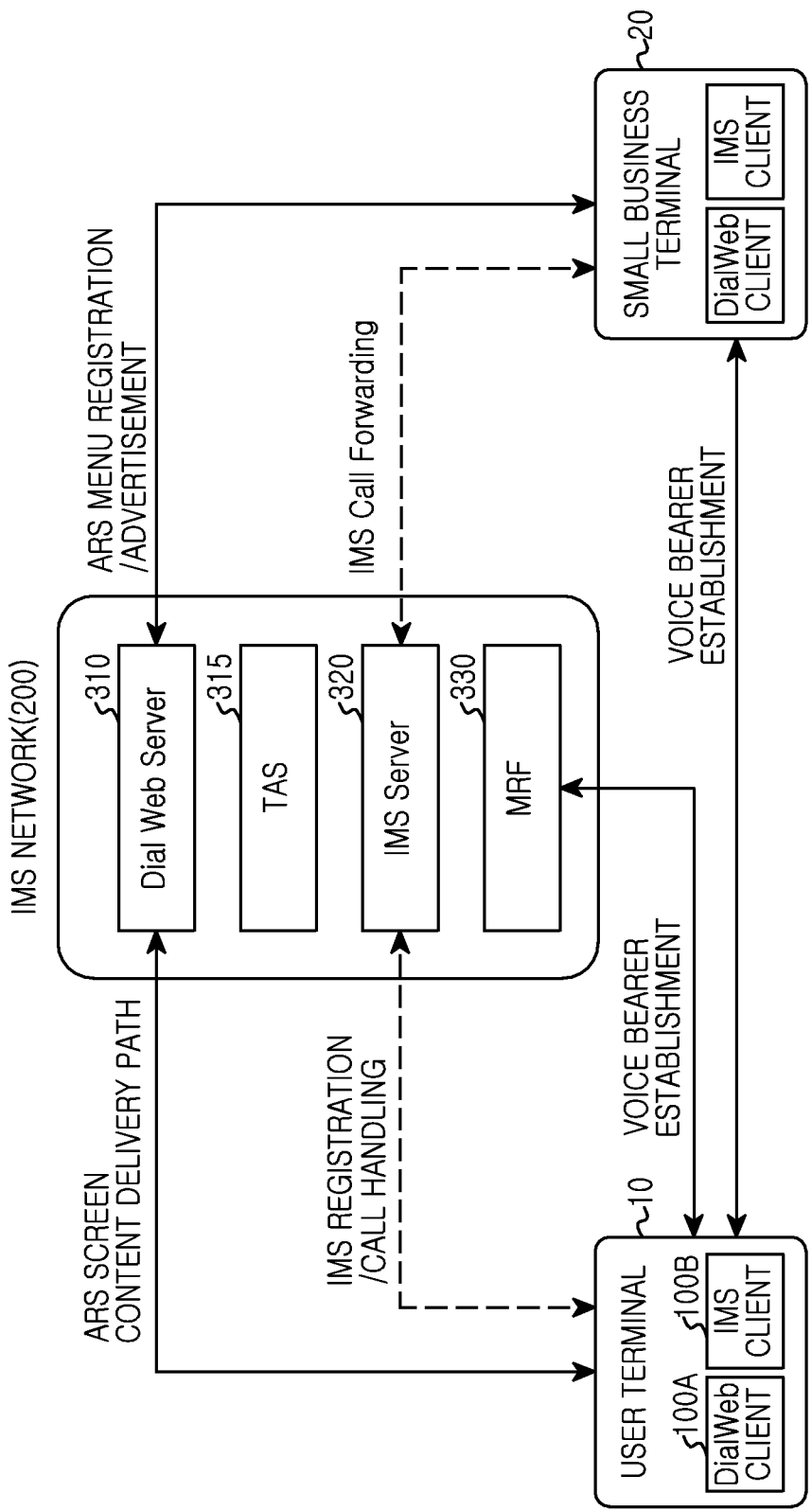
FIG. 4 is a diagram illustrating a structure of a composite ARS service providing system, according to an embodiment of the present invention.

FIG. 4 is a diagram illustrating a structure of a composite ARS service providing system, according to an embodiment of the present invention. In FIG. 4, the composite ARS service providing system includes the user terminal 10 as a transmitting-side terminal, the small business terminal 20 as a receiving-side terminal, and the IMS network 200 for providing the user terminal 10 with a composite ARS service according to a composite ARS scenario for the small business terminal 20. The IMS network 200 includes the dial web server 310, a Telephony Application Server (TAS) 315, the IMS server 320, and the MRF 330.

According to the structure of FIG. 3, the DialWeb server 310 performs a function of receiving a call to a small business, and thus, prevents a telephony delivery to the small business terminal 20 during which the user terminal 10 receives a voice/video-based composite ARS service. When the MRF 330 receives an instruction of connecting directly to the small business terminal 20 through a Dual Tone Multi-Frequency (DTMF), a call establishment function is performed. Specifically, the MRF 330 performs a TAS function together.

According to the structure of FIG. 4, an additional function for a call reception is performed by using the TAS 315, and the DialWeb server 310 performs an operation only for the voice/video-based composite ARS service.

Referring to FIG. 3 and FIG. 4, the IMS server 320 is in charge of IMS user registration and call handling. The IMS server 320 includes a Proxy Call State Control Function (P-CSCF), an Interrogating (I)-CSCF, and a Serving (S)-CSCF. The IMS server 320 performs the IMS registration on the user terminal 10, and handles a call from the user terminal 10. In addition, the IMS server 320 delivers an IMS call from the user terminal 10 to the small business terminal 20.

The DialWeb server 310 performs the following roles.
1) Managing a terminal screen configuration file for a voice/video-based composite ARS service.
2) Permitting HTTP access to the user terminal, and delivering a screen configuration file.
3) Managing a multimedia file and MSML/VoXML for voice/video playing using the MRF.
4) Providing an MRF Controller (MRFC) with an IMS Service Control (ISC) interface (indirect access) or Cr interface (direct access between MRFC and IMS AS) so that a voice and advertisement media content can be delivered to the user terminal 10 via the MRF 330.
5) Providing a voice additional service by substituting the TAS if the existing TAS cannot support a flow, according to an embodiment of the present invention.

The DialWeb server 310 provides the small business terminal 20 with a toolkit for configuring a scenario and for creating an advertisement message. A result thereof is content for a video ARS screen and content for a voice ARS, such as, for example, a Media Server Markup Language (MSML)/Voice XML (VoXML) or a media content file. The result is managed by being stored (e.g., in a database) in the DialWeb server 310.

The MRF 330 performs the following roles.
1) Providing an ARS voice service and multimedia content for an advertisement to the user terminal 10 by bringing a voice ARS scenario for each small business from the DialWeb server 310 on a real-time basis.
2) Collecting DTMF, and delivering DTMF to the TAS 315 or the DialWeb server 310 when a request of delivering a call to the small business terminal 20 is recognized.

The TAS 315 performs the following roles.
1) Performing a function of receiving a call establishment request of the terminal 10, which uses the ARS service.
2) Performing a call delivery so that the terminal 10 can connect an HTTP session via the DialWeb serve 310 and an ISC (communication between IMS ASs).
3) Stopping a call delivery to the small business terminal 20 during which a voice/video ARS is executed for the small business terminal 20.
4) Receiving a session end through Mr' (direct access) or ISC (indirect access) with an MRFC, and performing call delivery to the small business terminal 20.

Figure 5:
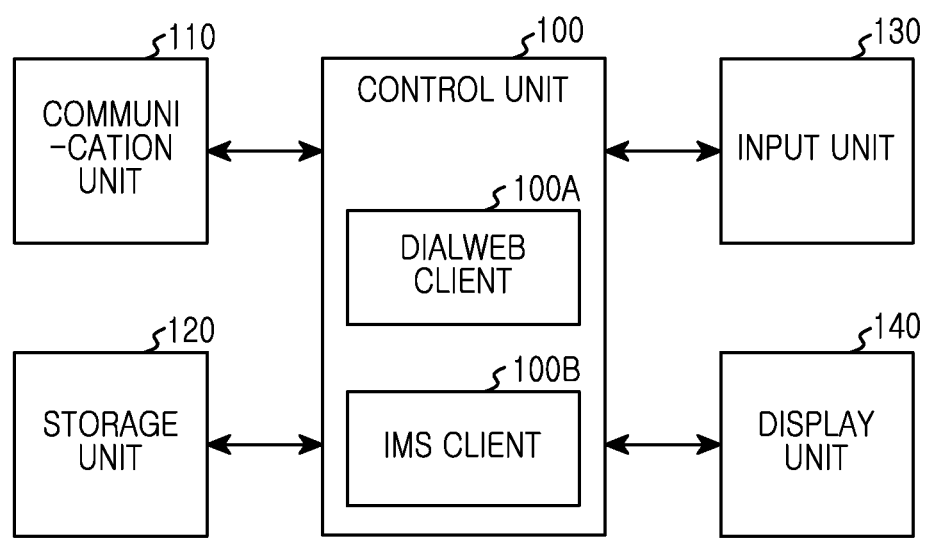
FIG. 5 is a diagram illustrating a structure of a user terminal, according to an embodiment of the present invention.

FIG. 5 is a diagram illustrating a structure of a user terminal, according to an embodiment of the present invention. For example, the user terminal may be the user terminal 10 and the small business terminal 20 of FIG. 3 and FIG. 4.

Referring to FIG. 5, the user terminal 10 (or small business terminal 20) includes a communication unit 110, a storage unit 120, an input unit 130, a display unit 140, and a control unit 100. The user terminal 10 may be embodied as a typical smart phone, a PC, or a softswitch-based in-door telephone.

The communication unit 110 performs communication channel configuration for voice telephony or video telephony, and communication channel configuration for data transmission/reception such as, for example, a video, a message, and the like, under the control of the control unit 100. The user terminal 10 transmits a call request message via the communication unit 110, receives an instruction for downloading ARS content from the DialWeb server 310 of the IMS network 200, and is provided with content for a video ARS service. The user terminal 10 is provided with content for a voice ARS service from the MRF 330 of the IMS network 200 via the communication unit 110.

The storage unit 120 may include a cache memory, a Dynamic Random Access Memory (D-RAM), a Static Random Access Memory (S-RAM), a flash memory, a magnetic disk storage device, an optical disk storage device, and the like. The storage unit 120 stores content for a video ARS received from the DialWeb server 310 and content for a voice ARS received from the MRF 330.

The input unit 130 receives numeric or character information, which is input from the user of the user terminal 10. The input unit 130 may include a plurality of input keys and function keys for setting various functions of the user terminal 10. The function keys may include a direction key, a side key, a shortcut, and the like, configured to perform specific functions. The input unit 130 may include any one or two of a touch panel, a microphone, a button, a mouse, a remote control, a jog wheel, and a jog switch.

The display unit 140 may include a Liquid Crystal Display (LCD), a Light Emitting Diode (LED), an Organic Light Emitted Diode (OLED), a speaker, a headphone, an earphone, and the like. The display unit 140 may output video ARS content and voice ARS content received from the communication unit 110 in a synchronized state.

The control unit 100 operates as a terminal client, which receives a voice/video-based composite ARS service provided from the IMS network 200. The control unit 100 may include a micro processor (e.g., a Central Processing Unit (CPU), a Digital Signal Processor (DSP), etc.) or a micro computer.

As the terminal client, the control unit 100 includes a DialWeb client 100A and an IMS client 100B.

The IMS client 100B performs the following functions.

1) Requesting call establishment to the IMS server 320 when there is a user request.

2) Receiving a Session Initiation Protocol (SIP) message method from a network and interpreting it, so that the DialWeb client 100A performs HTTP access and downloads a file for ARS screen configuration.

The DialWeb client 100A performs the following functions.

1) Performing an HTTP access and authentication process on the DialWeb server 310 at the request of the terminal IMS client 100B, and thereafter downloading a file for a video ARS screen configuration to output to a terminal screen.

2) Delivering interaction information with respect to the user to the DialWeb server 310 so that a voice/video ARS service can be provided smoothly.

According to an embodiment of the present invention, as a standard server, the IMS server performs IMS user registration and call handling.

Figure 6:
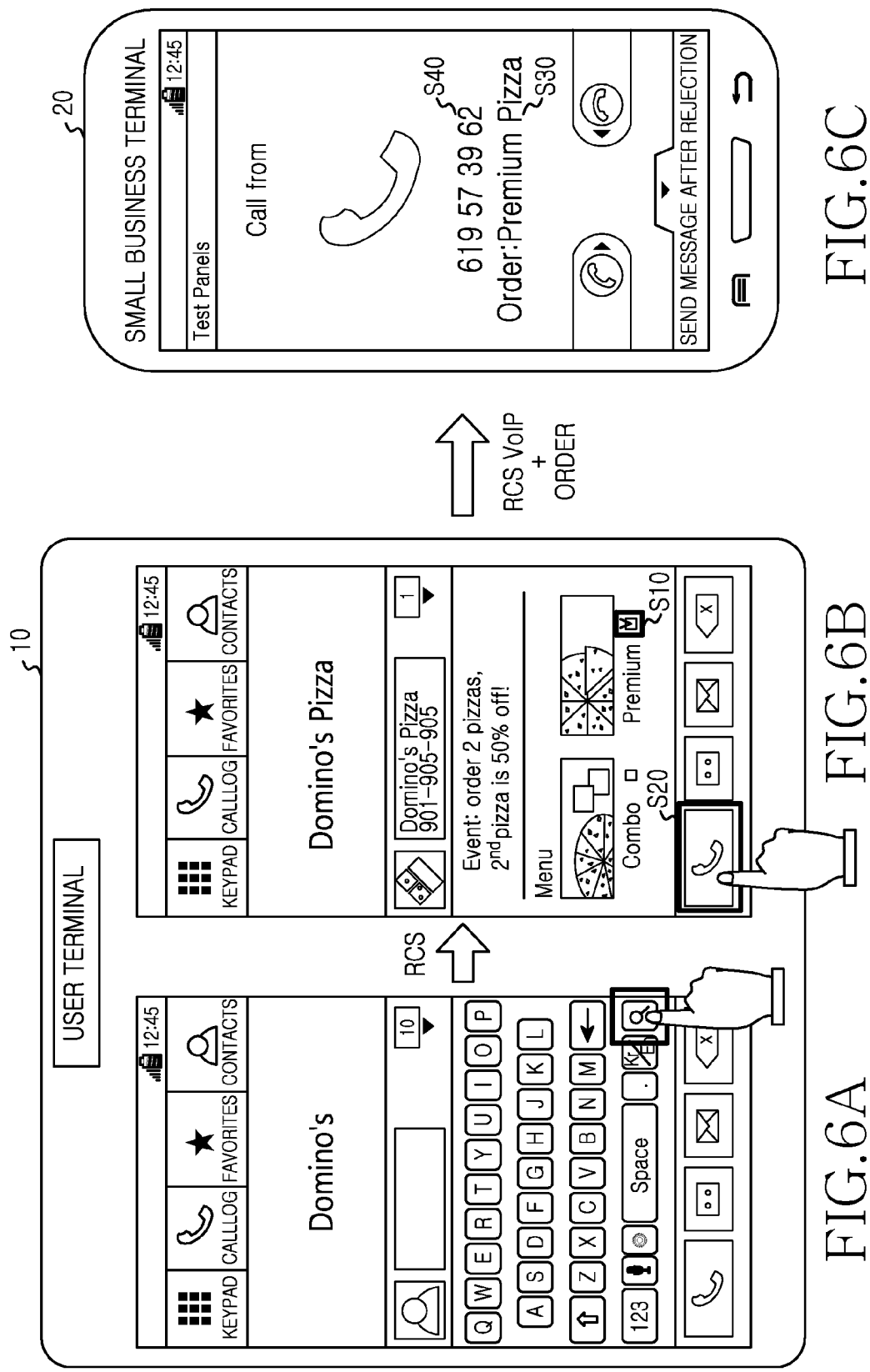
FIGS. 6A-6C are diagrams illustrating screens displayed at terminals when a composite ARS service is provided, according to an embodiment of the present invention.

FIGS. 6A-6C are diagrams illustrating screens displayed at terminals when a composite ARS service is provided, according to an embodiment of the present invention. FIGS. 6A and 6B illustrate screens displayed at the user terminal 10, and FIG. 6C illustrates a screen displayed at the small business terminal 20.

When a user searches for and discovers a small business on the user terminal 10, content (e.g., menu and event information) related to the discovered small business is provided, as shown in FIGS. 6A and 6B. The content provided in this case is ARS service information, and may be provided not only in a video screen but also in a voice manner. Upon confirming the ARS service information, when the user selects a menu item S10 (e.g., a premium pizza) and presses a call button S20, a call is connected to the small business terminal 20 and an order detail is provided. The order detail S30 (e.g., a premium pizza) is displayed on a screen of the small business terminal 20 together with a telephone number S40 (e.g., 619 57 39 62) of a transmitting side.

Hereinafter, an operation of providing a composite ARS service, according to an embodiment of the present invention, is described with reference to FIG. 7 and FIG. 8. It is assumed that a communication vendor provides a toolkit for creating a voice/video-based composite ARS scenario configuration and advertisement message for each small business to provide an ARS service for small businesses. A composite ARS scenario and advertisement message for each small business are stored in the DialWeb server 310. In an embodiment of the present invention, the voice ARS scenario is stored in a file format such as VoiceXML and MSML, and the video ARS scenario is stored in a file format such as HTML, XML, and CSS. It is assumed that both of the user terminal ("A" terminal) 10 and the small business terminal ("B" terminal) 20 are IMS terminals, and are registered to the IMS network 200.

Figure 7:
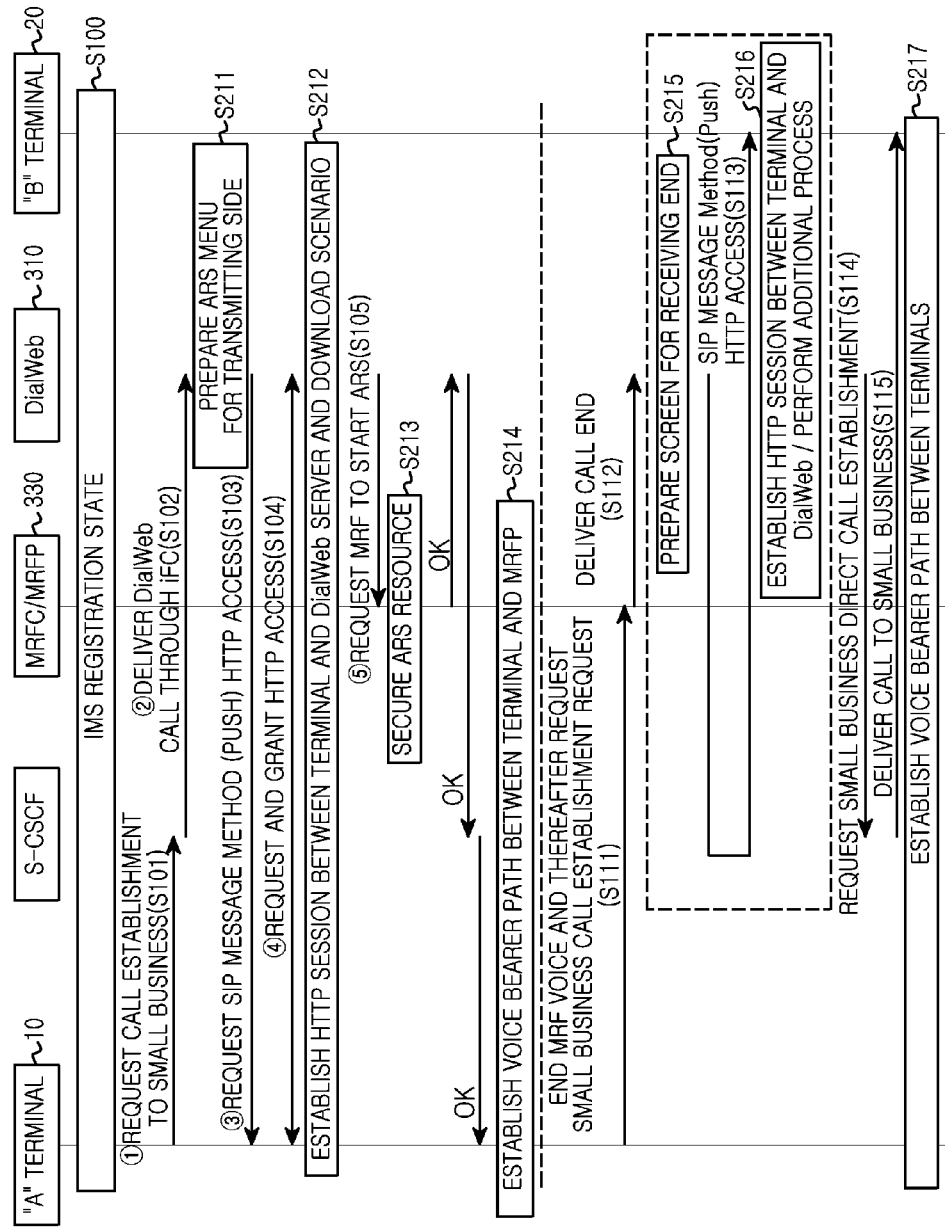
FIG. 7 is a flowchart illustrating the providing of a composite ARS service, according to an embodiment of the present invention.

FIG. 7 is a flowchart illustrating the providing of a composite ARS service, according to an embodiment of the present invention. The flowchart of FIG. 7 corresponds to the system of FIG. 3.

Referring to FIG. 7, when in an IMS registration state S100, the "A" (user) terminal has both an IMS client function and a DialWeb client function. When a call request is delivered to a phone number of a small business by the IMS client 100B of the "A" terminal 10, in step S101, an IMS server 320, i.e., S-CSCF, delivers this request to a DialWeb server 310 through an iFC configuration, in step S102. The DialWeb server 310 prepares a voice ARS resource to be provided by an MRF and a video ARS screen to be displayed to a transmitting-side terminal screen based on a small business phone number (or an SIP ID) requested by a user, in step S211. When a file for the voice/video ARS service does not exist or when it is determined that a user does not use the present service by the DialWeb server 310, a corresponding call is retransmitted to the small business terminal 20 without alteration, as requested.

When an incoming phone number is a number registered to a DialWeb service and when a resource for the voice/video ARS service exists, the DialWeb server 310 performs an HTTP access by using an SIP message method (or a push message) and requests to download a resource to be displayed to a screen for an ARS service, in steps S103 and S104. That is, the DialWeb server 310 requests the "A" terminal 100 to perform an HTTP access, in step S103, and in response to the request, the "A" terminal 10 requests the HTTP access, and the DialWeb server 310 grants the HTTP access request, in step S104. An HTTP session is established between the "A" terminal 10 and the DialWeb server 310, and a scenario for the video ARS is downloaded, in step S212.

Thereafter, the DialWeb server 310 requests the MRF 330 (e.g., MRF C(Controller)/MRF P(Processor)) to download a required resource for a voice ARS by using a Cr interface or an ISC interface, in step S105. The MRF 330 secures the resource in response to the request, in step S213. Steps S105 and S213 are shown as being performed after the steps S104 and S212 are complete, however, in another embodiment of the present invention, steps S105 and S213 may be performed simultaneously with steps S104 and S212.

The downloading of a scenario for a screen ARS service through an HTTP access of a terminal and a request on an MRF to start a voice ARS service may operate in a blocking mode or a non-blocking mode. When operating in the blocking mode, the terminal receives the screen ARS scenario before the voice ARS service starts, and thus, an initial synchronization problem between a voice and a video can be avoided. However, service quality may deteriorate when a delay time is increased in this case to such an extent that it can be recognized by the user according to a network situation.

When operating in the non-blocking mode, although the quality problem depending on the service delay can be avoided to some extent, an additional synchronization method is required for synchronization between a screen and a voice. A synchronization method is used in which synchronization is achieved by using header information of a voice Real-time Transport Protocol (RTP) packet and meta information of an HTML or XML file for the screen. When the DialWeb client 100A downloads ARS content based on at least one of HTML, XML, and Cascading Style Sheets (CSS) from the DialWeb server 310, the DialWeb client 100A may change the downloaded ARS content to an HTML-based ARS menu and display it to a screen, and may notify the IMS client 100B to transmit a voice at a time the ARS menu starts to display on the screen. In this case, the user terminal buffers the voice until the video is displayed to the display unit to synchronize the voice and the video. To synchronize the HTML-based ARS content displayed to the screen of the user terminal and a voice message output by the user terminal, the DialWeb client 100A compares mapping information recorded in metadata of the HTML file and mapping information recorded in head information (e.g., a field of a Synchronization Source (SSRC) identifier) of the voice RTP packet.

When all preparations are complete, a confirmation signal (i.e., OK) is delivered to the "A" terminal 10, and a voice bearer is established between the "A" terminal 10 and the MRF 330, in step S214. When steps S212 and S214 are performed, a communication vendor's ARS substitution service starts, which simultaneously provides voice and video.

In an embodiment of the present invention, a voice ARS service configuration and a screen ARS service configuration are determined by a small business. Under the assumption that the small business uses an ARS service toolkit provided by a communication vendor, and thus, a screen scenario and a voice scenario are matched according to a pre-verified method, matching of an individual voice file and a video file corresponding thereto are processed in the terminal.

While the ARS substitution service is performed, an ARS menu selection generated by the user may be delivered to the MRF 330 by the DTMF, and may be delivered to the DialWeb server 310 according to a screen selection. Alternatively, the ARS menu selection may be delivered simultaneously to the MRF 330 and the DialWeb server 310.

If the user selects a small business direct connection menu (or requests a call establishment to a small business) from the menu configuration, this event is delivered to the MRF 330 by using the DTMF, and in response thereto, the MRF 330 releases a corresponding bearer connection resource, in step S111. The MRF 330 delivers a final resource release state to the DialWeb server 310 through an Mr' interface or an ISC, in step S112.

The DialWeb server 310 performs the following process according to a signal, which is input autonomously. This process provides a response from a transmitting side as to a form which is proposed in advance by a small business and which is to be displayed on the small business terminal 20, i.e., a receiving side, or for providing a screen that is configured for a normal receiving side by the transmitting side. The process may be performed selectively.

The DialWeb server 310 prepares to deliver a corresponding call to the small business based on call end state delivery information from the MRF 330 or voice ARS end information with respect to the MRF directly received by the DialWeb server 310. If the transmitting side is also a user subscribed to the DialWeb service and a screen for the receiving side is prepared, a screen configuration to be displayed to the "B" terminal 20 is prepared, in step S215. If the screen configuration to be displayed to the "B" terminal 20 is prepared, the DialWeb server 310 requests the "B" terminal 20 to download a resource for configuring a receiving-side screen by performing an HTTP access by the use of an SIP message method (or a push message), in step S113. Accordingly, an HTTP session is established between the DialWeb server 310 and the "B" terminal 20, and the receiving-side screen is displayed to the "B" terminal 20, in step S216. If the small business provides a screen in an HTML form to request specific information to the transmitting side, and if the user completes a response for the screen, this selection information may also be delivered to the small business together with screen information configured by the transmitting side. If the screen configuration for the receiving side is not necessary, steps S215, S113, and S216 may be omitted.

If the screen configuration handling for the small business is complete, or if the screen configuration for the receiving side is not necessary, the DialWeb server 310 delivers to the "B" terminal 20 a telephony connection request requested from the "A" terminal 10, in steps S114 and S115. In this case, the DialWeb server 310 requests a small business direct call establishment to the S-CSCF, in step S114, and in response thereto, the S-CSCF delivers a call to the "B" terminal 20, in step S115. Accordingly, a peer-to-peer voice bearer is connected between the "A" terminal 10 and the "B" terminal 20, and a voice service (e.g., a VoLTE voice service) may be provided, in step S217. In this case, various multimedia services may be provided simultaneously via the DialWeb server 310 during a telephone call between terminals.

Figure 8:
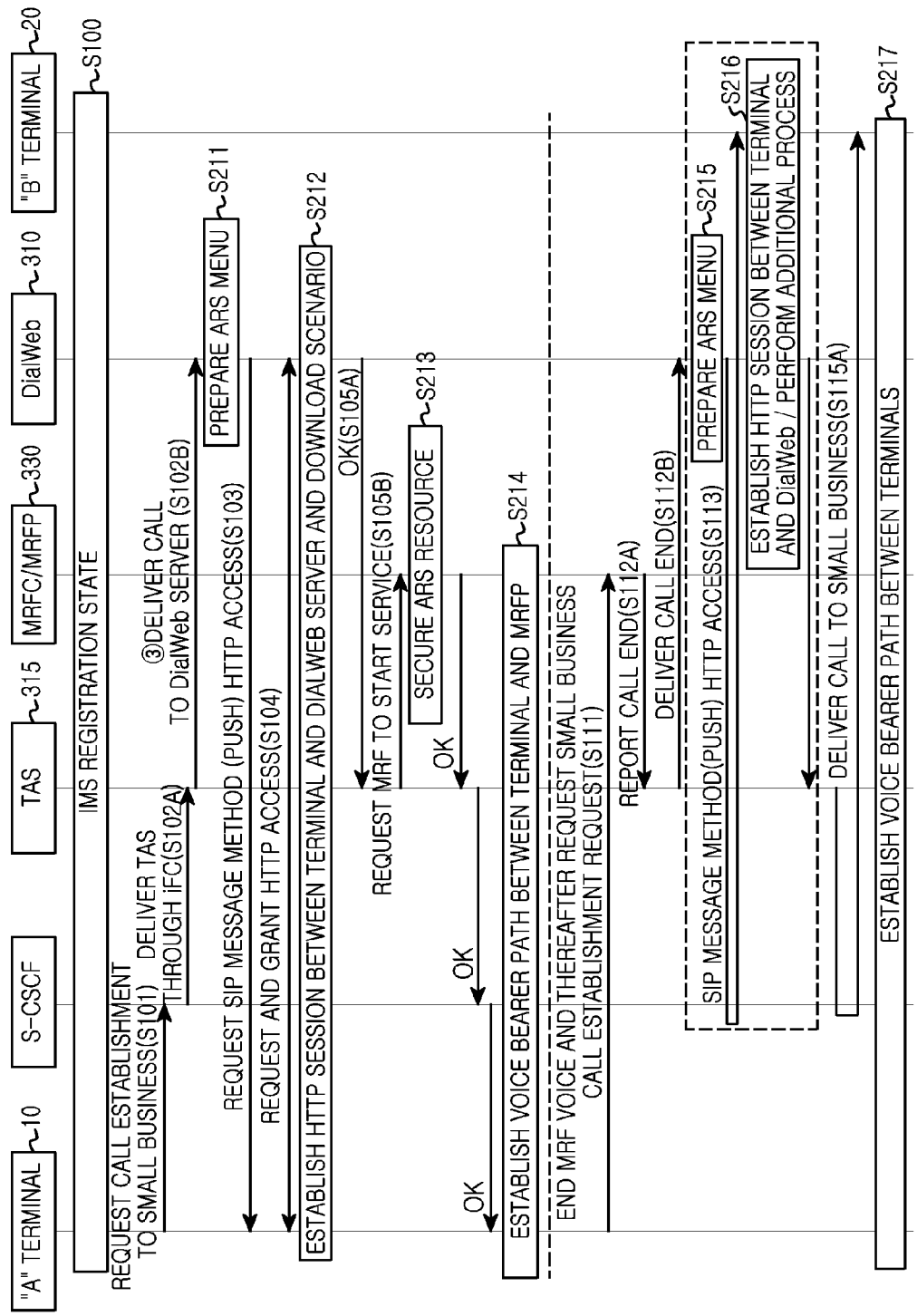
FIG. 8 is a flowchart illustrating the providing of a composite ARS service, according to an embodiment of the present invention.

FIG. 8 is a flowchart illustrating the providing of a composite ARS service, according to an embodiment of the present invention. The flowchart of FIG. 8 corresponds to the system of FIG. 4, and some of functions of the DialWeb server 310 are performed by the TAS 315, which is present in the existing network.

Referring to FIG. 8, if a DialWeb service is to be provided through the existing TAS 315, a terminal's receiving function is performed via the TAS 315. A call establishment request performed by the IMS client 100B is delivered from the "A" terminal 10 to the TAS 315 via an S-CSCF through an iFC configuration, in steps S101 and S102A. The TAS 315 delivers this request to the DialWeb server 310, in step S102B. An execution of an HTTP session establishment process performed by the DialWeb server 310 with respect to the "A" terminal 10 and an ARS service initiation request to an MRF 330 are performed in manner similar to that described with respect to FIG. 7. However, an operation of a blocking mode or a non-blocking mode is controlled by the TAS 315. After the HTTP session establishment process is performed between the "A" terminal 10 and the DialWeb server 310, in step S212, the DialWeb server 310 transmits an OK signal to the TAS 315, in step S105A. The TAS 315 requests the MRF 330 to start a service, in step S105B. In response to the request, the MRF 330 secures a resource for a voice ARS, in step S213. A voice bearer configuration between the MRF 330 and the "A" terminal is established in the same manner as described with respect to FIG. 7, in step S214.

A connection request of a small business is delivered during the ARS service, in step S111. A request state depending on the MRF 330 is recognized through a DTMF collection, and a state recognition of the DialWeb server 310 is recognized through an HTTP connection, in step S112A. This message is delivered to the DialWeb server 310 via the TAS 315, in step S112B, and the MRF 330 releases a related resource.

Steps S215, S113, and S216 are identical to those provided in FIG. 7. An operation of delivering a call to a small business terminal 20 is performed by the TAS 315 instead of the DialWeb server 310. Accordingly, a call delivery from the TAS 315 is delivered to the "B" terminal 20 via the S-CSCF, in step S115A. Consequently, a peer-to-peer voice bearer is connected between the "A" terminal 10 and the "B" terminal 20, and a voice service (e.g., a VoLTE voice service) is provided, in step S217.

As described above, in embodiments of the present invention, since a communication vendor can directly provide a voice/video-based composite ARS substitution service by utilizing the existing IMS system, small businesses can provide the ARS service without having to implement an expensive ARS service system. In an embodiment of the present invention, each small business can provide different advertisement/event information or the like to a user through a telephony connection.

Operations according to embodiments of the present invention may be implemented by using a single controller.

In this case, a program instruction for performing an operation implemented with various computers may be recorded in a computer readable recording medium. The computer readable recording medium may include a program instruction, a data file, a data structure, etc., in an independent or combined manner. The program instruction may be designed and configured particularly for embodiments of the present invention, or may be known and usable to those ordinarily skilled in the art.

The computer readable recording medium may be a hardware device configured particularly to store and perform a program instruction, for example, a hard disk, a magnetic medium such as a floppy disc and a magnetic tape, an optical storage medium such as a Compact Disc-Read Only Memory (CD-ROM) or a Digital Versatile Disc (DVD), a magnetic-optic medium such as a floptical disc, a Read Only Memory (ROM), a Random Access Memory (RAM), a flash memory, and the like. An example of the program instruction includes not only a machine language created by a compiler but also a high-level language executable by a computer by using an interpreter or the like. When an eNB or a relay described in an embodiment of the present invention is entirely or partially implemented with a computer program, a computer readable recording medium that stores the computer program is also included in the present invention.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of operating a server for providing a composite automatic response system (ARS) service through a mobile communication network, the method comprising:
   storing composite ARS related information generated by a first electronic device, the composite ARS related information including visible ARS related information and voice ARS related information;
   receiving, from a second electronic device, a first message for requesting call establishment with the first electronic device;
   providing the visible ARS related information to the second electronic device and establishing a path between the server and the second electronic device for the voice ARS related information, in response to reception of the first message, before call establishment between the first electronic device and the second electronic device;
   receiving, from the second electronic device, a second message for requesting the call establishment between the first electronic device and the second electronic device, while the composite ARS service is provided by the server to the second electronic device based on a synchronization between the visible ARS related information and the voice ARS related information; and
   performing, based on the receiving the second message, the call establishment between the first electronic device and the second electronic device.

2. The method of claim 1, further comprising:
   blocking a delivery of the first message for requesting the call establishment with the first electronic device while the composite ARS service is provided to the second electronic device based on the composite ARS related information.

3. The method of claim 1, wherein providing the composite ARS related information comprises:
   establishing a session for a visible information exchange with respect to the second electronic device in response to reception of the first message.

4. The method of claim 1, wherein the second message for requesting the call establishment between the first electronic device and the second electronic device comprises a piece of information selected from information included in the composite ARS related information.

5. The method of claim 1, wherein the mobile communication network comprises an internet protocol (IP) multimedia subsystem (IMS), and
   wherein the server is included in the mobile communication network.

6. A method of operating an electronic device for receiving a composite automatic response system (ARS) service through a mobile communication network, the method comprising:
   transmitting a first message for requesting call establishment with a first electronic device, to a server;
   receiving visible ARS related information from the server and establishing a voice path between the electronic device and the server for voice ARS related information, before call establishment between the electronic device and the first electronic device; and
   transmitting a second message requesting for the call establishment between the electronic device and the first electronic device while the composite ARS service is provided by the server to the electronic device based on a synchronization between the visible ARS related information and the voice ARS related information,
   wherein composite ARS related information, which is generated by the first electronic device and stored in the server, includes the visible ARS related information and the voice ARS related information.

7. The method of claim 6, further comprising:
   establishing a session for a visible information exchange with respect to the server.

8. The method of claim 6, wherein the visible ARS related information comprises information based on at least one of hypertext markup language (HTML), extensible markup language (XML), and cascading style sheets (CSS).

9. The method of claim 6, wherein the voice ARS related information comprises information based on at least one of media server markup language (MSML) and VoiceXML.

10. The method of claim 6, wherein the second message for requesting the call establishment between the electronic device and the first electronic device comprises a piece of information selected from information included in the composite ARS related information.

11. The method of claim 6, wherein the mobile communication network comprises an IP multimedia subsystem (IMS), and
    wherein the server is included in the mobile communication network.

12. A server system for providing a composite automatic response system (ARS) service through a mobile communication network, the server system comprising:
    a storage configured to store composite ARS related information generated by a first electronic device, the composite ARS related information including visible ARS related information and voice ARS related information, and
    at least one processor configured to:
    receive a first message for requesting call establishment with the first electronic device from a second electronic device, provide the visible ARS related information to the second electronic device and establish a path between the server system and the second electronic device for the voice ARS related information, in response to reception of the first message, before call establishment between the first electronic device and the second electronic device, receive, from the second electronic device, a second message for requesting the call establishment between the first electronic device and the second electronic device, while the composite ARS service is provided by the server system to the second electronic device based on a synchronization between the visible ARS related information and the voice ARS related information, and perform, based on the receiving the second message, the call establishment between the first electronic device and the second electronic device.

13. The server system of claim 12, wherein the at least one processor is further configured to:

block a delivery of the first message for requesting the call establishment to the first electronic device while the composite ARS service is provided to the second electronic device based on the composite ARS related information.

14. The server system of claim 12, wherein the at least one processor is further configured to:

establish a session for a visible information exchange with respect to the second electronic device in response to the reception of the first message requesting call establishment, and establish the path for the voice ARS related information exchange with respect to the second electronic device.

15. The server system of claim 12, wherein the second message for requesting the call establishment between the first electronic device and the second electronic device comprises a piece of information selected from information included in the composite ARS related information.

16. The server system of claim 12, wherein the mobile communication network comprises:

an IP multimedia subsystem (IMS), comprising an IMS server.

17. An apparatus for an electronic device receiving a composite automatic response system (ARS) service through a mobile communication network, the apparatus comprising:

at least one transceiver configured to communicate through the mobile communication network; and at least one processor configured to control the at least one transceiver, wherein the at least one processor is further configured to control the at least one transceiver to:

transmit a first message for requesting call establishment with a first electronic device, to a server, receive visible ARS related information from the server and establishing a path between the electronic device and the server for voice ARS related information, before call establishment between the electronic device and the first electronic device, and transmit, to the server, a second message for requesting the call establishment between the electronic device and the first electronic device, while the composite ARS service is provided by the server to the electronic device based on a synchronization between the visible ARS related information and the voice ARS related information, wherein the composite ARS related information, which is generated by the first electronic device and stored in the server, includes the visible ARS related information and the voice ARS related information.

18. The apparatus of claim 17, wherein the at least one processor is further configured to:

establish a session for a visible information exchange with respect to the server.

19. The apparatus of claim 17, wherein the second message for requesting the call establishment between the electronic device and the first electronic device comprises a piece of information selected from information included in the composite ARS related information.

20. The apparatus of claim 17, wherein the mobile communication network comprises an IP multimedia subsystem (IMS), and wherein the server is included in the mobile communication network.

* * * * *